United States Patent [19]
Breslawsky

[11] Patent Number: 5,898,916
[45] Date of Patent: Apr. 27, 1999

[54] CORDLESS TELEPHONE FOR USE WITH DICTATION SYSTEM

[75] Inventor: Marc C Breslawsky, Weston, Conn.

[73] Assignee: Dictaphone Corporation, Stratford, Conn.

[21] Appl. No.: 08/639,310

[22] Filed: Apr. 25, 1996

Related U.S. Application Data

[63] Continuation of application No. 08/269,327, Jun. 30, 1994, abandoned.

[51] Int. Cl.$^6$ .................................................... H04B 1/06
[52] U.S. Cl. .............................................. 455/412; 369/25
[58] Field of Search ................................ 379/58, 60, 61, 379/74, 75, 89; 369/29, 25; 455/412

[56] References Cited

U.S. PATENT DOCUMENTS

| | | |
|---|---|---|
| 4,571,457 | 2/1986 | Hattori et al. . |
| 4,833,702 | 5/1989 | Shitara et al. .............................. 379/60 |
| 4,843,498 | 6/1989 | Grat Von Zedlitz Und Trützschler ................... 369/25 X |
| 4,881,259 | 11/1989 | Scordato .................................. 455/412 |
| 4,955,051 | 9/1990 | Sato ........................................... 379/75 |
| 4,969,136 | 11/1990 | Chamberlin et al. ..................... 369/29 |
| 5,003,575 | 3/1991 | Chamberlin . |
| 5,235,571 | 8/1993 | Ellermeier ................................. 369/25 |
| 5,265,075 | 11/1993 | Bergeron et al. ......................... 369/25 |
| 5,276,916 | 1/1994 | Pawlish et al. . |
| 5,319,620 | 6/1994 | Hohenbuchler et al. ................. 369/29 |
| 5,721,537 | 2/1998 | Protas ................................. 340/825.44 |

FOREIGN PATENT DOCUMENTS

WO 90/13196  11/1990  WIPO .

*Primary Examiner*—William Cumming
*Attorney, Agent, or Firm*—Whitman Breed Abbott & Morgan; Gregor N. Neff

[57] ABSTRACT

This invention relates to dictation systems that utilize cordless telephones. The cordless telephone generates audio that is received by a dictation system. The handset of the cordless telephone has a record control switch and a review/play switch thereon that control the sending and receiving of audio signals to and from the dictation system. A PBX can be connected to the base and with the dictation system so that the individual using the cordless phone is able to perform dictation activities with a plurality of dictation systems.

12 Claims, 4 Drawing Sheets

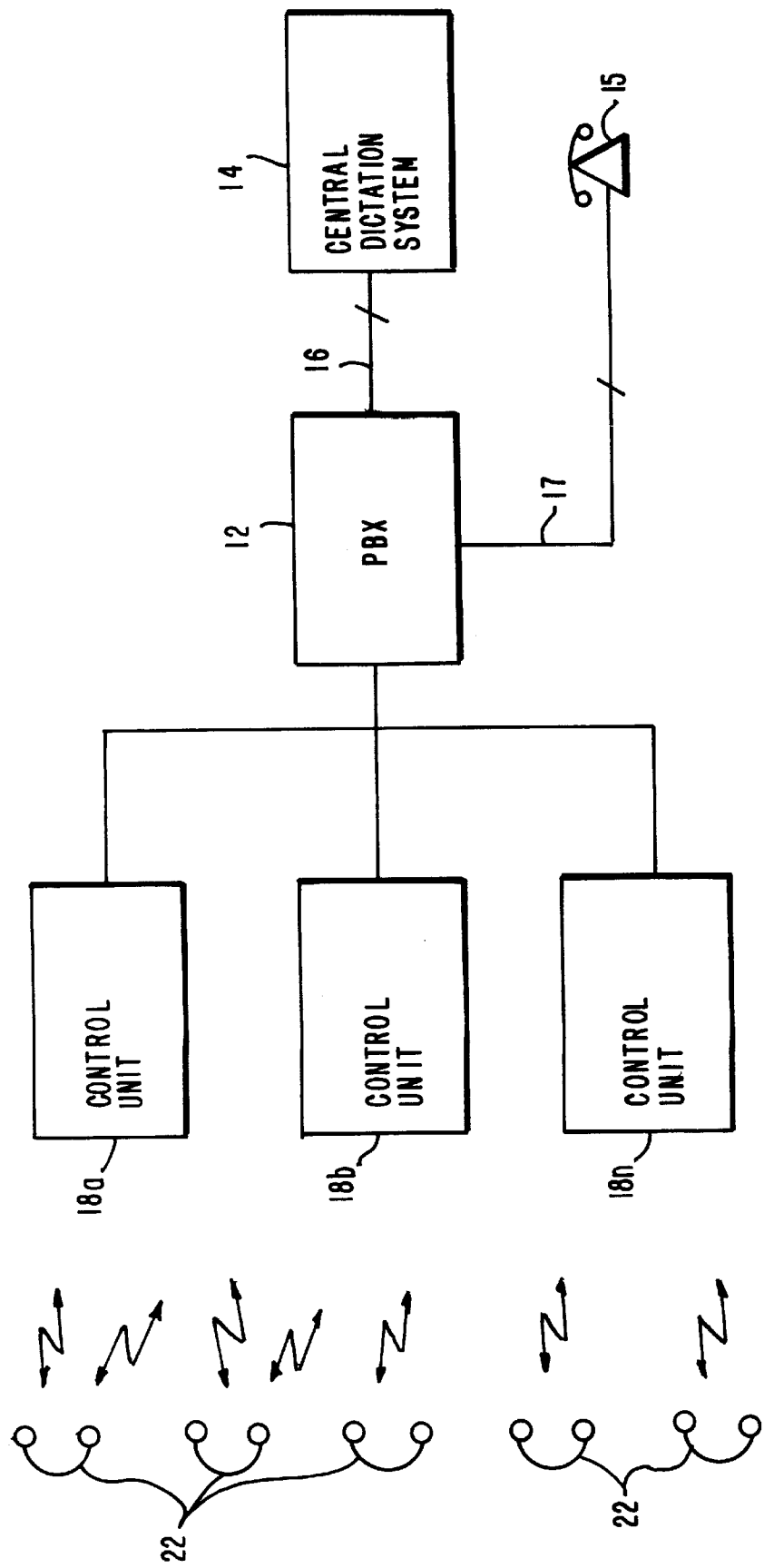

CORDLESS TELEPHONE FOR USE WITH DICTATION SYSTEM

This application is a continuation of application Ser. No. 08/269,327, filed Jun. 30, 1994, abandoned.

BACKGROUND OF THE INVENTION

There are different types of dictation systems commercially available, including desk top dictating machines, relatively large central dictation systems and dictation systems that can be utilized in a small office environment. The instant invention can have use in any of these areas, but it is concerned primarily with central dictation systems that are used in locations such as hospitals, large law offices, large corporations and the like.

In a central dictation system, voice data is stored in a central memory and can be retrieved by a transcriptionist at any time without the need of transferring a medium such as a tape. Another advantage is that earlier dictated audio can be transcribed while dictation is taking place. In central dictation systems, the dictator can use a telephone that emits DTMF signals to control the functioning of the dictation system. Such telephones are well known and have been described in various patents, see for example, U.S. Pat. No. 4,969,136.

Although such central dictation systems work well, one drawback of contemporary systems is that they require a corded telephone that is stationed at a given location, thereby requiring the dictator to be at that location in order to create a message. Clearly, it would be advantageous if one could dictate a message to or obtain information from a central dictation system without being limited to a specific location or locations. In addition, it would be advantageous to give a user of the dictation equipment the ability to dictate a message or receive stored audio while being mobile. This would be particularly useful when the dictator makes reference to a large number of papers spread across a table during dictation.

SUMMARY OF THE INVENTION

A cordless telephone for use with a central dictation system has been conceived. The term cordless telephone as used in the disclosure is one that is not hard wired and encompasses a cordless device. The cordless telephone of the instant invention comprises a handset and a telephone base. Conveniently located dictation control thumb switches are located on the handset for controlling dictation operations with a dictation system. The cordless telephone is basically a novel handset that has circuitry therein for emitting a radio frequency signal that is receivable by the telephone base. The base is connected to a dictation system, which connection can be direct, through a PBX or through a telephone network. The dictation system stores audio that is received from the cordless telephone, which can be retrieved either by the user of the cordless telephone or by a transcriptionist.

The handset includes a key pad that is connected to a microprocessor for the purpose of sending signals under control of the dictator indicating the activities to be performed. These activities includes contacting a dictation system, providing a password, responding to prompts and the like. The microprocessor is connected to an RF modulator/demodulator that transmits RF signals at a frequency receivable by the telephone base. Upon receipt of such RF signals, the base establishes communication between the operator of the cordless telephone and the dictation system. Through use of the thumb switches, the dictator can either dictate messages or review a message dictated previously.

BRIEF DESCRIPTION OF THE DRAWING

In the Figures described below, like numbers are used to describe like parts.

FIG. 4 is a block diagram showing use of the invention with a plurality of cordless phones and a central dictation system.

DETAILED DESCRIPTION OF THE PREFERRED EMBODIMENTS

Figure 1:
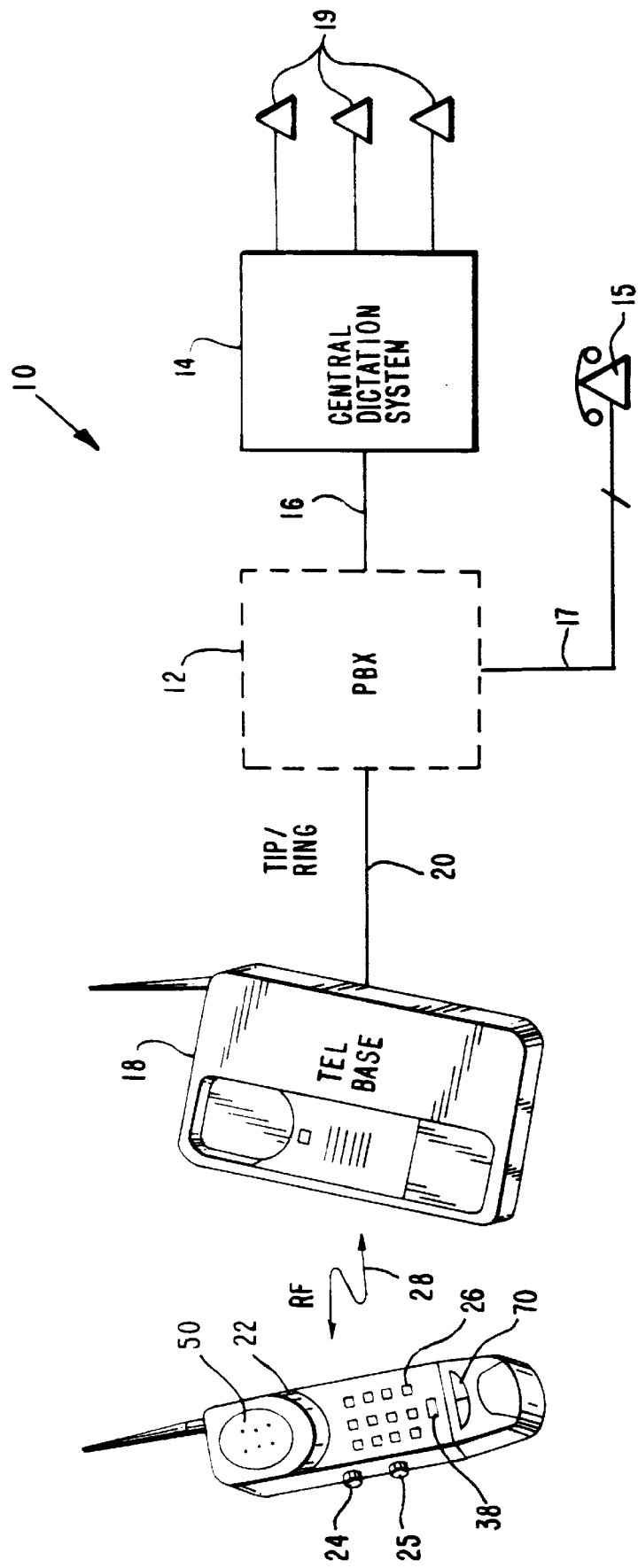
FIG. 1 is partially a perspective view of a cordless handset and partially a block diagram that shows a central dictation system in an environment such as a hospital.

With reference to FIG. 1, a first embodiment is shown generally at 10 that would involve a large business environment, such as a hospital, law office, commercial office and the like. The embodiment 10 includes a PBX 12 that is in connection with a central dictation system 14 and telephones 15 through telephone lines 16, 17 respectively. PBX systems are well known and need no description and dictation systems also are well known and are commercially available, as for example, the DX4000™ dictation system and the DX7000™ dictation system both available from Dictaphone Corporation.

A plurality of transcription devices 19 are connected to the central dictation system 14 as is conventional with dictation systems. Although only one central one telephone 15 is shown, it will be appreciated that the instant invention can be used with a plurality of telephones 15 and a dictation system connected to the PBX 12.

A telephone base 18 connects to the PBX 12 through a tip/ring communication line 20. Telephone bases 18 for cordless telephones of the type contemplated in this invention are well known and are commercially available from such companies as Panasonic Corporation and AT&T Inc.

Figure 2:
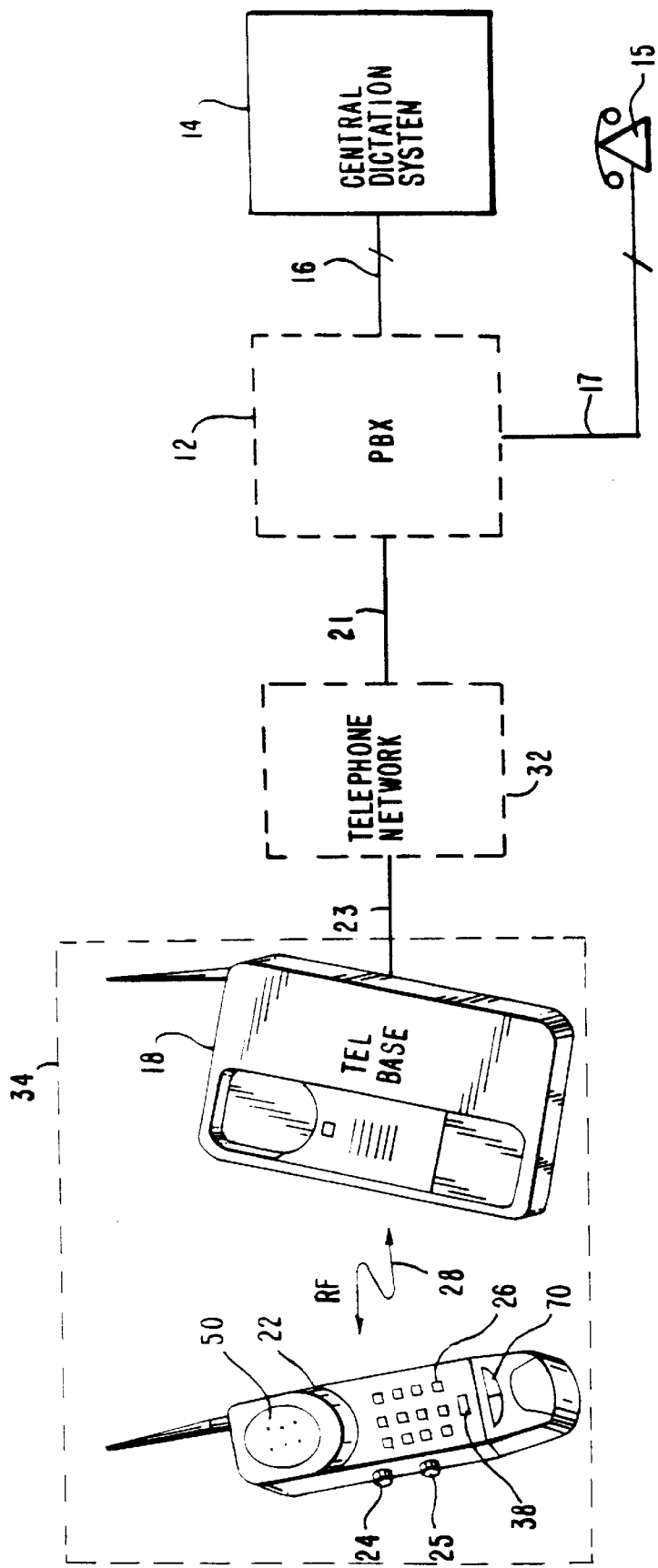
FIG. 2 is similar to FIG. 1 showing a block diagram of an alternative embodiment of the invention as it can be used in a residential or small office environment.
Figure 3:
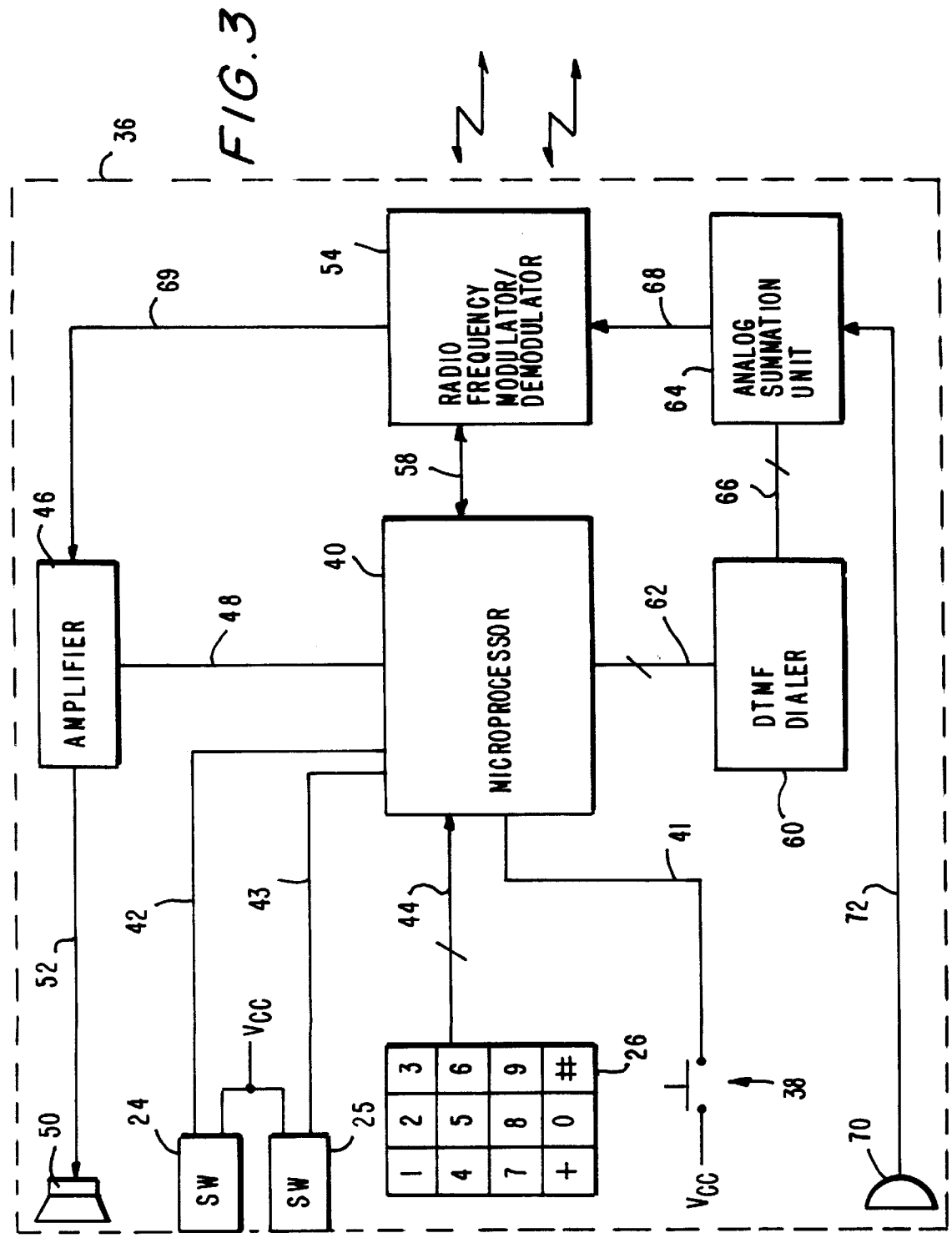
FIG. 3 is a circuit diagram of an example of a circuitry that can be used for the handset shown in FIGS. 1 & 2.

Although the invention as shown in FIGS. 1, 2 and 4 is described as having a PBX 12, it will be appreciated that a PBX is not an essential part of the invention as direct communication can be had between the base 18 and the central dictation system 14. A handset 22 is provided which is similar to a conventional cordless telephone handset to the extent that a microphone 70 is located at one end thereof and a speaker 50 at its other end. The handset 22 has a record control switch 24 and a review/play switch 25 on the side thereof that are conveniently located for operation by the user's thumb when the handset is held for dictation. Through use of the record control switch 25 and microphone 70, dictation can be transmitted to the dictation system 14, and through use of the review/play control switch 25, a dictation review and play mode can be initiated. A key pad 26, which will be described in greater detail hereinafter with reference to FIG. 3, is housed by the handset 22 on the face thereof, as is an on/off switch 38. The handset 22 is capable of emitting radio waves 28 at a frequency that are detectable by the base 18. With the system shown in FIG. 1, one is able to both transmit and receive audible signals between a cordless dictation handset 22 and a dictation system 14. This is accomplished by the handset 22 emitting radio waves 28 which are received by the base station 18 that in turn established communication with the PBX 12. Although only one handset 22, one base station 18 and one dictation system 14 are shown, it will be appreciated that a plurality of such units can be used in a wireless PBX environment, but for purposes of explanation the system is described with only one of each such units in FIG. 1.

With reference now to FIG. 2, a similar system is shown that would be used in a residential or small office environment 34. An optional PBX 12 is connected to the dictation system 14 and telephones 15 through telephone lines 16, 17 as before, but the PBX is accessed via a telephone network 32, through telephone lines 21. Once more, the telephone network 32 is optional since the base 18 could be connected directly either to the PBX 12 or central dictation system 14. The handset 22 is contemplated as being within or about the residence 34 and the base 18 is in connection with the telephone network 32 through a tip/ring line 23 over which communication can be established. It will be appreciated that the system 34 will allow the user to be in one part of a residence, or in the immediate vicinity, and still be able to exchange audio with the dictation system 14, thereby providing mobility to the user. Even with a user being in a given room, the user can move about freely referencing dispersed materials while dictating.

With reference to FIG. 3, a preferred embodiment of a circuitry for the handset 22 will be described, but it will be understood other circuits could also be used as well. The handset 22 has a housing 36 in which the keypad 26 is supported. The keypad has the standard twelve keys, 0–9, star (*) and pound (#). The on/off hook switch 38 is in communication with a microprocessor 40 through lead 41. The microprocessor 40 can be one of many commercially available processors such as an Intel 80C51. The record control switch 24 is connected to the microprocessor 40 through lines 42 and 43 and the keypad 26 communicates with microprocessor through leads 44.

An amplifier 46 connects with the microprocessor 40 through a lead 48 over which a ring generation signal is carried. The speaker, or ear piece 50, is in connection with the amplifier through a lead 52. Also in connection with the microprocessor is a DTMF dialer 60 through leads 62. The DTMF dialer 60, in turn, is in connection with an analog summation unit (ASU) 64 through control lines 66. The ASU 64 connects with an RF modulator/demodulator (RFMD) 54 through a transmission line 68. The RFMD 54 is in connection with the amplifier 46 through an audio receive line 69, with the microprocessor 40 through a RF control line 58, and with the ASU through the lead 68. The microphone, or mouthpiece 70, is supported by the housing 36 and is connected to the ASU 64 through a lead 72.

In operation, in order to transmit dictation over the handset 22 or to receive audio from the dictation system 14, the operator presses the off-hook switch 38. With such pressing of the off-hook switch 38, all the units of the handset 22 become enabled. An appropriate sequence of numbers is entered through the keypad 26 for the purpose of making contact with the dictation system 14 and another sequence of numbers may have to be entered to identify the caller as a subscriber of the dictation system that is to be addressed. Upon the depression of the appropriate keys of the keypad 26, the microprocessor activates the DTMF dialer causing it the generate DTMF tones. These DFMF tones are then received and summed by the ASU 64 and sent to the RFDM 54. At this point, the RFDM 54 transmits appropriate modulated RF signals that are received by the base 18 which dials the system through the line 20. Thereafter, the dictation system 14 that is dialed will be placed in communication with the handset 22. As with other dictation telephones of the type described, a telephone 15 can be dialed instead.

In order to record dictation on the dictation system 14, the operator enables the thumb record control switch 24 located on the side of the handset 22 by pressing the same and a touch tone burst is generated by the microprocessor 40 over line 42 which will cause the RFDM 54 to establish record transmission with the dictation system 14. The operator speaks into the microphone 70 whereupon analog voice signals are received by the ASU 64. These signals are then sent to the RF demodulation 54 which then transmits radio frequency signals that are received by the base 18. The base 18, in return, will send audio signals over the tip/ring line 20 to the PBX 12 and establish communication with the dictation system 14. As stated previously, the PBX 12 is optional and contact can be directly with the dictation system 14.

The operator can pause in the dictation mode by releasing the record control switch 24. This cycle of record and release is repeated until the recording session is completed. Thereafter, the user can press the review/play switch by thumb control and the dictation will be played back over the receive audio line 69 and heard over the earpiece 50 after demodulation of the incoming signals by the RFMD 54.

With reference to FIG. 2, the same operation will take place, except that the operator would be communicating with the PBX 12, as for example, from or about a residence 34. As seen in this embodiment, the base 18 can communicate with a telephone network 32 through a telephone line 23. The telephone network 32, depending upon the number dialed through the keypad 26, will connect the base 18 with the PBX 12 and thereafter with the dictation system 14. The dictation operation and playback will be the same as described with FIG. 1. As stated previously, contact between the base 18 and the dictation system 14 can be direct when they are both located within the same facility.

With regard to FIG. 4, a plurality of handsets 22 can be used in a large wireless PBX environment, such as a hospital. Each of the handsets is capable of communicating with a plurality of control units 18a, 18b . . . 18n of a type that is similar to those used with cellular phones. Since such control units 18 are conventional, further description is not provided. Each of these control units 18a, 18b . . . 18n is in communication with a PBX 12 which in turn is in communication with dictation system 14. In this way, an individual is able to communicate with a dictation system 14 no matter where located within a facility so long as the individual is in proximity with one of a number of control units 18, thereby, providing free movement to the user.

Thus, what has been described with reference to FIGS. 1–4 is a dictation system wherein a subscriber is able to communicate with the dictation system with the option of being at one of a number of different locations. The subscriber is free to move about so long as the subscriber is within the communication range of the base 18. With contemporary technology, such distance is approximately 50 to 100 feet. Although the invention has been described primarily as used with a central dictation system, it will be appreciated that the invention can be applied to other types of dictation equipment.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A wireless telephone and dictation handset comprising, in combination, a housing shaped to fit into the hand, a keypad mounted to said housing for use in making telephone calls, a wireless communications device in said housing for wireless communication of voice signals and dictation control signals between said handset and a remote station to control dictation and reproduction of the dictation of the user of said handset, a loudspeaker and a microphone in said housing for reproducing and receiving vocal sound, and at least one dictation control switch operable for developing dictation control signals, said switch being mounted on said housing in a position to be actuated by the hand holding said handset when said handset is held in a position for use in dictation, said handset including a microprocessor in communication with said keypad and said dictation control switch, and said wireless communications device includes a RF modulator/demodulator in communication with said loudspeaker, said microphone and said microprocessor for RF transmission of voice signals from the user of said handset and control switch signals to control dictation recording and reproducing equipment remote from said handset to record and reproduce dictation from said user.

2. A handset as in claim 1, in which said microphone and loudspeaker are located in one side of said housing and said dictation control switch is located on said housing in a location spaced from said one side so as to permit operation of said control while said handset is held with said microphone adjacent the user's mouth.

3. A handset as in claim 1, including another dictation control switch, said control switches including a record control switch and a review/play switch located on one side of said housing angularly displaced from the side of said housing on which said keypad is located.

4. A wireless telephone and dictation handset comprising, in combination, a housing shaped to fit into the hand, a keypad mounted to said housing for use in making telephone calls, a wireless communications device in said housing for wireless communication of voice signals and dictation control signals between said handset and a remote station, a loudspeaker and a microphone in said housing for reproducing and receiving vocal sound, and at least one dictation control switch operable for developing dictation control signals, said switch being mounted on said housing in a position to be actuated by the hand holding said handset when said handset is held in a position for use in dictation, said handset including a microprocessor in communication with said keypad and said dictation control switch, and said wireless communications device includes a RF modulator/demodulator in communication with said loudspeaker, said microphone and said microprocessor for RF transmission of voice signals and control switch signals to control dictation recording and reproducing equipment remote from said handset, including an of-hook switch connected to said microprocessor, a DTMF dialer in communication with said RF modulator/demodulator and said microprocessor, and an analog summation unit connected to receive signals from said microphone and said DTMF dialer and deliver an analog summation signal to said RF modulator/demodulator.

5. A dictation system, said system comprising, in combination;

a dictation station;

dictation recording and reproducing equipment at said station;

a device for selectively forming a connection between said dictation station and a wireless station; and a wireless telephone handset at a location remote from said dictation station, said handset having;

a housing shaped to fit into the hand, a key pad mounted to said housing for use in making telephone calls, a wireless communications device in said housing for wireless communication of voice signals and dictation control signals between said handset and said wireless station for operating said recording and reproducing equipment at said dictation station to record and reproduce dictation from the user of said handset, a loudspeaker and a microphone in said housing for reproducing and receiving vocal sound, and at least one dictation control switch mounted on said housing in a position to be actuated by the hand holding said handset when said handset is held in a position for use in dictation and adapted to generate dictation control signals when manually operated.

6. A system as in claim 5, in which said microphone and loudspeaker are located on one side of said housing and said dictation control switch is spaced from said one side so as to permit operation of said control while said handset is held with said microphone adjacent the user's mouth.

7. A system, as in claim 5, in which said handset includes a microprocessor in communication with said keypad and said dictation control switch, and said wireless communications device includes a RF modulator/demodulator in communication with said loudspeaker, said microphone and said microprocessor.

8. A system, as in claim 5, in which said dictation station includes a central storage unit and plurality of input/output terminals.

9. A dictation system, said system comprising, in combination:

a sound recording and reproducing machine for recording and reproducing dictation;

a cordless telephone base remote from said sound recording and reproducing machine and adapted to be selectively connected to said sound recording and reproducing machine; and a cordless telephone handset, said handset having; a housing shaped to fit into the hand, a keypad mounted to said housing for use in making telephone calls, a wireless communications device in said housing for wireless communication of voice signals and dictation control signals between said handset and said cordless telephone base, and at least one dictation control switch mounted on said housing in a position to be actuated by the hand holding said handset when said handset is held in a position for use in dictation, said dictation control switch being adapted to generate dictation control signals when operated to cause said recording and reproducing machine to record and reproduce dictation from the user of said handset.

10. A system as in claim 9, in which said microphone and loudspeaker are located in one side of said housing and said dictation control switches are located in a portion of said housing spaced from said one side so as to permit operation of said control while said handset is held with said microphone adjacent the user's mouth.

11. A system as in claim 9, in which said handset includes a microprocessor in communication with said keypad and said dictation control switch, and said wireless communications device includes a RF modulator/demodulator in communication with said loudspeaker, said microphone and said microprocessor.

12. A dictation system, said system comprising, in combination:

a sound recording and reproducing machine for recording and reproducing dictation;

a cordless telephone base adapted to be selectively connected to said sound recording and reproducing machine; and a cordless telephone handset, said handset having; a housing shaped to fit into the hand, a keypad mounted to said housing for use in making telephone calls, a wireless communications device in said housing for wireless communication of voice signals and dictation control signals between said handset and said cordless telephone base, and at least one dictation control switch mounted on said housing in a position to be actuated by the hand holding said handset when said handset is held in a position for use in dictation, said dictation control switch being adapted to generate dictation control signals when operated, in which said handset includes a microprocessor in communication with said keypad and said dictation control switch, and said wireless communications device includes a RF modulator/demodulator in communication with said loudspeaker, said microphone and said microprocessor, and including an off-hook switch connected to said microprocessor, a DTMF dialer in communication with said RF modulator/demodulator and said microprocessor, and an analog summation unit connected to receive signals from said microphone and said DTMF dialer and deliver an analog summation signal to said RF modulator/demodulator.

\* \* \* \* \*